United States Patent
Gomi et al.

(10) Patent No.: US 9,570,758 B2
(45) Date of Patent: Feb. 14, 2017

(54) MANUFACTURING METHOD AND MANUFACTURING APPARATUS FOR GAS DIFFUSION LAYER OF FUEL CELL, AND FUEL CELL

(75) Inventors: Yuichi Gomi, Nishio (JP); Katsuhide Kikuchi, Kariya (JP); Hiroshi Fujitani, Toyota (JP); Akito Kawasumi, Toyota (JP); Junji Nakanishi, Kasugai (JP); Kenji Tsubosaka, Susono (JP)

(73) Assignees: NIPPON SOKEN, INC., Nishio (JP); TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 781 days.

(21) Appl. No.: 13/697,311

(22) PCT Filed: Jun. 22, 2011

(86) PCT No.: PCT/JP2011/064859
§ 371 (c)(1),
(2), (4) Date: Nov. 9, 2012

(87) PCT Pub. No.: WO2012/005146
PCT Pub. Date: Jan. 12, 2012

(65) Prior Publication Data
US 2013/0059226 A1    Mar. 7, 2013

(30) Foreign Application Priority Data

Jul. 5, 2010 (JP) .................................. 2010-152668
Nov. 29, 2010 (JP) .................................. 2010-264861

(51) Int. Cl.
*H01M 4/88*    (2006.01)
*H01M 8/02*    (2016.01)
*H01M 8/10*    (2016.01)

(52) U.S. Cl.
CPC ......... *H01M 4/8807* (2013.01); *H01M 8/0234* (2013.01); *H01M 8/1007* (2016.02);
(Continued)

(58) Field of Classification Search
CPC .................. H01M 8/0234; H01M 2008/1095; H01M 8/1007
See application file for complete search history.

(56) References Cited

U.S. PATENT DOCUMENTS 4,894,355 A * 1/1990 Takeuchi et al. ............. 502/101
2005/0181264 A1 * 8/2005 Gu et al. ........................ 429/38
(Continued)

FOREIGN PATENT DOCUMENTS

CN    1650452 A    8/2005
CN    1700544 A    11/2005
(Continued)

OTHER PUBLICATIONS

Kosako et al. (JP, 2003-282088) (a raw machine translation) (Claims & Detailed Description).*
(Continued)

*Primary Examiner* — Miriam Stagg
*Assistant Examiner* — Carmen Lyles-Irving
(74) *Attorney, Agent, or Firm* — Andrews Kurth Kenyon LLP (57) ABSTRACT

A method of manufacturing a fuel cell. An insulating member has a plurality of communication holes disposed on a side of a gas diffusion layer, which is formed by stacking a layer made of a carbon fiber and a water-repellent layer, where the water-repellent layer is provided. The gas diffusion layer and the insulating member are sandwiched by a pair of electrodes, and a pair of contact pressure plates are disposed on respective rear surfaces of the pair of electrodes so as to sandwich the pair of electrodes so that the gas
(Continued)

diffusion layer is pressurized by the pair of contact pressure plates. When a voltage is applied to the pair of electrodes while maintaining the pressurized state, the protrusion portion of the carbon fiber is burned and removed by Joule heat.

11 Claims, 8 Drawing Sheets

(52) U.S. Cl.
CPC ...... *H01M 2008/1095* (2013.01); *Y02E 60/50* (2013.01); *Y02P 70/56* (2015.11)

(56) References Cited

U.S. PATENT DOCUMENTS

2005/0269519 A1   12/2005   Kim et al.
2011/0207016 A1*  8/2011   Akiyama ................... 429/480

FOREIGN PATENT DOCUMENTS

| JP | 2001-085019 A | 3/2001 |
|----|---------------|--------|
| JP | 2004-006280 A | 1/2004 |
| JP | 2004-071324 A | 3/2004 |
| JP | 2004-111341 A | 4/2004 |
| JP | 2004-259463 A | 9/2004 |
| JP | 2004-281363 A | 10/2004 |
| JP | 2005-203308 A | 7/2005 |
| JP | 2006-004735 A | 1/2006 |
| JP | 2006-085930 A | 3/2006 |
| JP | 2006-086130 A | 3/2006 |
| JP | 2007-042347 A | 2/2007 |
| JP | 2007-042348 A | 2/2007 |
| JP | 2007-049613 A | 6/2007 |
| JP | 2007-149613 A | 6/2007 |
| JP | 2007-242378 A | 9/2007 |
| JP | 2008-181784 A | 8/2008 |
| JP | 2008-198526 A | 8/2008 |
| JP | 2008-218130 A | 9/2008 |
| JP | 2008-218368 A | 9/2008 |
| JP | 2008-269909 A | 11/2008 |
| JP | 2009-181891 A | 8/2009 |
| JP | 2010-102909 A | 5/2010 |
| JP | 2010-146769 A | 7/2010 |
| JP | 2010-161039 A | 7/2010 |
| WO | 03/081700 A1  | 10/2003 |
| WO | 2005/081339 A1 | 9/2005 |
| WO | 2008/129398 A2 | 10/2008 |

OTHER PUBLICATIONS

International Search Report and Written Opinion of PCT/JP2011/064859 mailed Oct. 18, 2011.

* cited by examiner

MANUFACTURING METHOD AND MANUFACTURING APPARATUS FOR GAS DIFFUSION LAYER OF FUEL CELL, AND FUEL CELL

This is a 371 national phase application of PCT/JP2011/064859 filed 22 Jun. 2011, which claims priority to Japanese Patent Application No. 2010-152668 filed 5 Jul. 2010, the contents of which are incorporated herein by reference.

FIELD OF THE INVENTION

The present invention relates to a manufacturing method and a manufacturing apparatus for a gas diffusion layer of a fuel cell, and to a fuel cell.

BACKGROUND OF THE INVENTION

Figure 8:
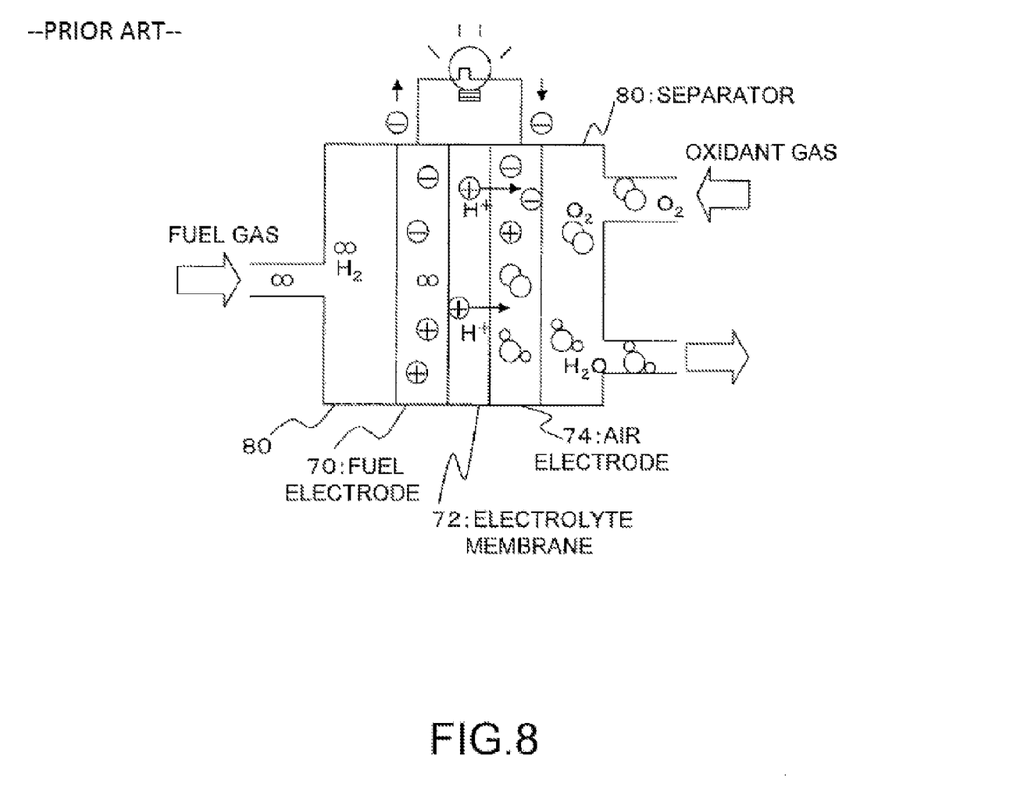
FIG. 8 is a view explaining a structure of a cell of a fuel cell and a mechanism for power generation.

For example, in a polymer electrolyte fuel cell, a cell is formed as a minimum unit by sandwiching a membrane electrode assembly (MEA), which, as illustrated in FIG. 8, is composed of a fuel electrode 70 and an air electrode 74 sandwiching an electrolyte membrane 72 formed of a polymer electrolyte membrane, with two separators 80, and a plurality of cells are normally stacked to form a fuel cell stack (an FC stack), which can provide a high voltage.

As the mechanism for generating electricity by a polymer electrolyte fuel cell, generally, fuel gas, such as hydrogen-containing gas, is supplied to the fuel electrode (i.e., anode-side electrode), and oxidant gas, such as gas mainly containing oxygen ($O_2$) or air, is supplied to the air electrode (i.e., a cathode-side electrode). The hydrogen-containing gas is supplied to the fuel electrode 70 through a fuel gas flow channel, and is decomposed into electrons and hydrogen ions ($H^+$) by an action of a catalyst of the electrode. The electrons move from the fuel electrode 70 to the air electrode 74 through an external circuit and produce electric current. Meanwhile, the hydrogen ions ($H^+$) pass through the electrolyte membrane 72 to reach the air electrode 74, where the hydrogen ions bond to oxygen and the electrons which have passed through the external circuit, to thereby produce reaction water ($H_2O$). The heat generated simultaneously with the bonding reaction of hydrogen ($H_2$) to oxygen ($O_2$) and the electrons is collected by cooling water. Further, water generated on the cathode side where the air electrode 74 is present (which will be hereinafter referred to as "generated water") is drained from the cathode side.

The fuel electrode and the air electrode of a fuel cell described above are formed of catalyst layers which include a stack of gas diffusion layers for diffusing hydrogen-containing gas and oxidant gas, respectively. Here, if the drainage of the generated water generated by the above-described reaction is interrupted on the cathode side, there is a possibility of occurrence of a clogging phenomenon (which is also referred to by "a flooding phenomenon"). In order to address this problem, the gas diffusion layer is generally formed of a layer made of carbon fibers and a water repellent layer, and prevents the flooding phenomenon by facilitating drainage of the generated water.

However, if at least a portion of the carbon fibers in the gas diffusion layer protrudes, this protruding portion of the carbon fibers may damage the membrane-electrode assembly when the gas diffusion layers are stacked to form the membrane-electrode assembly.

Patent Literature 1 suggests a gas diffusion layer material for a fuel cell, which has a smooth surface and which is thin, obtained by passing a fabric or non-woven fabric including flame-resistant threads for carbon fiber as main components through a thermo-compression roller to smooth the surface and reduce the thickness thereof, and thereafter subjecting the resultant fabric or non-woven fabric to final thermal processing at temperatures of 800 to 3000° C. Further, Patent Literature 2 suggests pre-heating the surface of a gas diffusion layer for a fuel cell, which is formed of a fabric composed of warp and weft made of carbon fiber, to thereby smooth the uneven surface of the carbon fiber, prior to disposing the gas diffusion layer on a polymer electrolyte membrane.

Meanwhile, Patent Literature 3 suggests a method for placing a gas diffusion layer base including fibers on a roller to curve the gas diffusion layer base and cause fiber protrusions protruding from the gas diffusion layer base to rise, and removing the fiber protrusions. Patent Literature 4 suggests a method of manufacturing a water-repellent gas diffusion layer having a two-layer structure, by using two types of water-repellent pastes having a conductive material and a water-repellent agent.

Patent Literature 1: JP 2004-111341 A
Patent Literature 2: Pamphlet of WO2003/081700
Patent Literature 3: JP 2008-198526 A
Patent Literature 4: JP 2009-181891 A

SUMMARY OF THE INVENTION

Technical Problems

However, the technology of smoothing the gas diffusion layer by pre-heating processing requires an increase in the number of processes, making the operation complicated. Further, even if the gas diffusion layer is curved to remove the fiber protrusions or the gas diffusion layer having a two-layer structure including a conductive material and a water-repellent agent is formed, when a cell of a fuel cell, which is formed by sandwiching opposite surfaces of a membrane-electrode assembly with gas diffusion layers, and further sandwiching the membrane-electrode assembly with a pair of separators, is layered in a stack, there is a possibility that a portion of the fibers buried within the gas diffusion layer will protrude because the thickness of the gas diffusion layer is reduced from the original thickness.

The present invention was conceived in view of the above problems and provides a manufacturing method and a manufacturing apparatus for a gas diffusion layer for a fuel cell, and a fuel cell, in which damage of a membrane-electrode assembly or an electrolyte membrane caused by protrusion of carbon fibers included in a gas diffusion layer is prevented.

Solution to Problems

In order to attain the above object, a manufacturing method and a manufacturing apparatus for a gas diffusion layer for a fuel cell, and a fuel cell, according to the present invention have the following features.

(1) A manufacturing method for a gas diffusion layer of a fuel cell includes a step of applying a predetermined pressure to a gas diffusion layer, formed by stacking a layer made of a carbon fiber and a water-repellent layer, in a thickness direction of the gas diffusion layer, and a step of removing a carbon fiber protruding from the water-repellent layer when the gas diffusion layer is pressed with the predetermined pressure, wherein the step of removing a protruding carbon fiber is a step of burning and removing the protruding carbon fiber by passage of electricity through the protruding fiber.

By applying, as the predetermined pressure, a pressure corresponding to a pressure which is used at the time of stacking cells of a fuel cell, for example, in the thickness direction of the gas diffusion layer and removing the carbon fiber protruding from the water-repellent layer in this pressed state, there can be prevented damage to a membrane-electrode assembly or to an electrolyte membrane caused by protrusion of the carbon fiber of the gas diffusion layer, when the cells of the fuel cell in which the gas diffusion layer is used are stacked.

Electricity can be passed through the protruding carbon fiber to thereby burn and remove the carbon fiber by Joule heat.

(2) In the manufacturing method for a gas diffusion layer of a fuel cell as described in above (1), the step of removing a protruding carbon fiber is a step of disposing an insulating member on a surface of the water-repellent layer which is opposite a surface thereof contacting the layer made of a carbon fiber, further disposing a pair of electrodes so as to sandwich the gas diffusion layer and the insulating member, and burning and removing the protruding carbon fiber by passage of electricity through the carbon fiber which protrudes from the water-repellent layer and further passes through the insulating member to come in contact with one of the electrodes.

By disposing an insulating member between the gas diffusion layer and the electrodes, it is possible to bring only a protruding carbon fiber into contact with the electrode for burning and removing the carbon fiber.

(3) In the manufacturing method for a gas diffusion layer of a fuel cell as described in above (2), prior to the passage of electricity through the carbon fiber which is protruding, the gas diffusion layer is slid in a direction of a plane of the gas diffusion layer relative to the insulating member, under a pressed state.

By sliding the gas diffusion layer relative to the insulating member, a carbon fiber which protrudes from the water-repellent layer but is in a fallen state is caused to rise so that a leading end of the carbon fiber comes into contact with the electrode. As a result, the percentage of removal of carbon fiber protruding from the water-repellent layer is increased, as compared to the case where the carbon fiber is not slid. Further, as excessive pressurization for causing the protruding carbon fiber to further protrude from the water-repellent layer is not required, the structure of the gas diffusion layer, particularly the structure of the layer made of carbon fibers, can be maintained.

(4) In the manufacturing method for a gas diffusion layer of a fuel cell as described in above (1), the step of applying a predetermined pressure is a step of instantaneously applying a pressure which is equal to or greater than a predetermined pressure to the gas diffusion layer only from a side of the gas diffusion layer where the layer made of a carbon fiber is provided, and the step of removing a protruding carbon fiber is a step of disposing an insulating member on a surface of the water-repellent layer which is opposite a surface thereof contacting the layer made of a carbon fiber, further disposing a pair of electrodes so as to sandwich the gas diffusion layer and the insulating member, and burning and removing the protruding carbon fiber by passage of electricity through the carbon fiber which protrudes from the water-repellent layer and further passes through the insulating member to come in contact with one of the electrodes.

When the water-repellent layer is formed of a microporous layer (hereinafter also referred to as an "MPL"), for example, by instantaneously applying a pressure which is equal to or greater than a predetermined pressure to the gas diffusion layer, a load is applied to the MPL instantaneously for burning and removing the protruding carbon fiber, so that pores of the MPL can be maintained.

(5) In the manufacturing method for a gas diffusion layer of a fuel cell as described in above (1) or (4), the predetermined pressure is a pressure corresponding to a contact pressure which is applied when a plurality of cells of a fuel cell are layered in a stack.

Even when a plurality of cells of a fuel cell are layered in a stack and a contact pressure is applied in the stacking direction of the plurality of cells, damage to a membrane-electrode assembly caused by carbon fibers in the gas diffusion layer can be prevented.

(6) In the manufacturing method for a gas diffusion layer of a fuel cell as described in any one of (1) to (5), a recess portion formed in the water-repellent layer when the carbon fiber protruding from the water-repellent layer is burned and removed is filled with a material which is of the same kind as a material forming the water-repellent layer.

By filling the recess portion in the water-repellent layer formed after removing the carbon fiber protruding from the water-repellent layer with a material which is of the same kind as a material forming the water-repellent layer, the electric conductivity, the gas diffusion property, and the draining property of the gas diffusion layer can be recovered.

(7) A fuel cell is formed by stacking an electric generator and a separator in an alternating manner, the electric generator being formed by disposing the gas diffusion layer manufactured by the manufacturing method for a gas diffusion layer of a fuel cell described in above (1) on a membrane-electrode assembly including a fuel electrode on one surface of an electrolyte membrane and an air electrode on the other surface of the electrolyte membrane.

In the fuel cell according to the present invention, as compared with a fuel cell including a gas diffusion layer in which the protrusion portion of a carbon fiber has not been processed by the above-described manufacturing method, damage of the membrane-electrode assembly caused by the protrusion portion of the carbon fiber can be reduced.

(8) A manufacturing apparatus for a gas diffusion layer of a fuel cell includes a pressurizing unit that applies a pressure to a gas diffusion layer, formed by stacking a layer made of a carbon fiber and a water-repellent layer, in a thickness direction of the gas diffusion layer, and a removing unit that removes a carbon fiber protruding from the water-repellent layer in a state in which the predetermined pressure is applied to the gas diffusion layer, wherein the removing unit includes an insulating member disposed on a surface of the water-repellent layer which is opposite a surface thereof contacting the layer made of a carbon fiber, a pair of electrodes provided so as to sandwich the gas diffusion layer and the insulating member, and a voltage application unit that applies a voltage to the pair of electrodes.

By applying, as the predetermined pressure, a pressure corresponding to a pressure which is applied at the time of stacking the cells of a fuel cell in the thickness direction of the gas diffusion layer and removing a carbon fiber protruding from the water-repellent layer under this pressed state, damage to a membrane-electrode assembly and an electrolyte membrane caused by the protrusion of the carbon fiber in the gas diffusion layer can be prevented at the time of stacking the cells of a fuel cell in which the gas diffusion layer is used.

By applying a voltage to a pair of electrodes in a state in which the carbon fiber which passes through and protrudes from the water-repellent layer and further penetrates through the insulating member comes in contact with one of the electrodes, electric current flows in the protruding carbon fiber having electric conductivity, so that the protruding carbon fiber can be burned and removed by Joule heat.

(9) In the manufacturing apparatus for a gas diffusion layer of a fuel cell as described in above (8), the insulating member includes a communication hole.

By applying a voltage to a pair of electrodes in a state in which the carbon fiber which passes through and protrudes from the water-repellent layer comes in contact with one of the electrodes through a communication hole of the insulating member, electric current flows in the protruding carbon fiber having electric conductivity, so that the protruding carbon fiber can be burned and removed by Joule heat. For example, as compared with a case in which a communication hole is not provided in the insulating member, it becomes easier for the carbon fiber penetrating through and protruding from the water-repellent layer to protrude from the insulating member via the communication hole, resulting in facilitation of burning and removing the protruding carbon fiber by Joule heat.

(10) The manufacturing apparatus for a gas diffusion layer of a fuel cell as described in above (8) further includes a gas diffusion layer sliding unit that slides the gas diffusion layer in a direction of a plane of the gas diffusion layer relative to the insulating member, under a pressed state.

By sliding the gas diffusion layer relative to the insulating member, the carbon fiber which protrudes from the water-repellent layer but is in a fallen state is caused to rise so that a leading end of the carbon fiber comes in contact with the electrode. Consequently, as compared to a case where the gas diffusion layer is not slid, the percentage of removal of the carbon fiber protruding from the water-repellent layer is increased. Further, because excessive pressurization for causing the protruding carbon fiber to further protrude from the water-repellent layer is not required, the structure of the gas diffusion layer, particularly the structure of the layer made of carbon fibers, can be maintained.

(11) In the manufacturing apparatus for a gas diffusion layer of a fuel cell as described in above (8), the pressurizing unit is a pressurizing unit that instantaneously applies a pressure which is equal to or greater than a predetermined pressure to the gas diffusion layer only from a side of the gas diffusion layer on which the layer made of a carbon fiber is provided, and the removing unit includes an insulating member disposed on a surface of the water-repellent layer which is opposite a surface thereof contacting the layer made of a carbon fiber, a pair of electrodes provided so as to sandwich the gas diffusion layer and the insulating member, and a voltage application unit that applies a voltage to the pair of electrodes.

When the water-repellent layer is formed of a microporous layer (hereinafter also referred to as an "MPL"), for example, by instantaneously applying to the gas diffusion layer a pressure which is equal to or greater than a predetermined pressure, a load is applied to the MPL instantaneously for burning and removing the protruding carbon fiber, so that pores of the MPL can be maintained. Further, by instantaneously applying to the gas diffusion layer a pressure which is equal to or greater than a predetermined pressure, in the thickness direction of the gas diffusion layer, the pressure distribution caused in the gas diffusion layer can be made different (namely, the volume of the deformation in the side of the layer made of a carbon fiber can become greater, while the volume of the deformation in the water-repellent layer side can become smaller), so that pores of the water-repellent layer side can be protected against being destroyed.

(12) In the manufacturing apparatus for a gas diffusion layer of a fuel cell as described in (8) or (11), the predetermined pressure is a pressure corresponding to a contact pressure which is applied when a plurality of cells of a fuel cell are layered in a stack.

Even when a plurality of cells of a fuel cell are layered in a stack and a contact pressure is applied in the stacking direction of the plurality of cells, damage to a membrane-electrode assembly caused by carbon fibers in the gas diffusion layer can be prevented.

(13) The manufacturing apparatus for a gas diffusion layer of a fuel cell as described in any one of (8) to (12) further includes a coating unit that applies a material which is of the same kind as a material forming the water-repellent layer in a recess portion which is formed in the water-repellent layer when burning and removing a carbon fiber protruding from the water-repellent layer.

By coating a material which is of the same kind as a material forming the water-repellent layer in the recess portion in the water-repellent layer formed after removing the carbon fiber protruding from the water-repellent layer to fill the recess portion, the electric conductivity, the gas diffusion property, and the draining property of the gas diffusion layer can be recovered.

Advantageous Effects of the Invention

According to the present invention, it is possible to prevent damage to a membrane-electrode assembly or an electrolyte membrane caused by protrusion of a carbon fiber of a gas diffusion layer when cells of a fuel cell in which the gas diffusion layer is used are stacked.

BRIEF DESCRIPTION OF THE DRAWINGS

These and other objects of the invention will be explained in the description below, in connection with the accompanying drawings, in which.

REFERENCE SIGNS LIST

10 frame, 12 pressurizing device, 14a, 14b contact pressure plate, 16a, 16b, 16c, 16d electrode, 17 metal film, 18 insulating member, 19 communication hole, 20, 52, 54 gas diffusion layer, 22 water-repellent layer, 24 carbon fiber, 26 soot-like carbon, 27 mixture, 28 filled portion, 30 power source, 32, 34, 36, 38 roller, 40 controller, 50 membrane-electrode assembly, 60 protrusion portion, 62, 64 separator.

DETAILED DESCRIPTION

A preferred embodiment of the present invention will be described with reference to the drawings.

Before explaining a manufacturing method and a manufacturing apparatus for a gas diffusion layer of a fuel cell according to the present embodiment, conditions of the damage of a membrane-electrode assembly due to protrusion of carbon fibers, which is caused when a plurality of cells of a fuel cell are layered in a stack, will be described with reference to FIG. 7.

Figure 7:
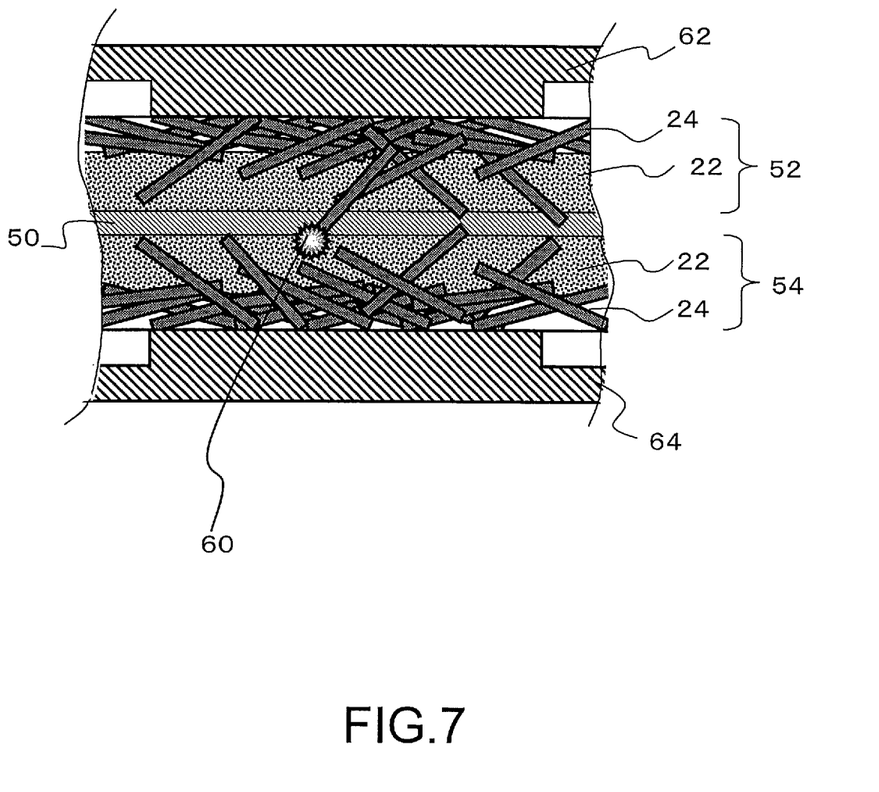
FIG. 7 is a view explaining an example situation of damage caused by protrusion of carbon fibers.

As illustrated in FIG. 7, a cell of a fuel cell is generally formed as follows. Specifically, on both surfaces of a membrane-electrode assembly (MEA) 50, formed by sandwiching an electrolyte layer with a pair of catalyst layers each functioning as an electrode, gas diffusion layers 52, 54 each formed by stacking a layer formed of carbon fibers 24 and a water-repellent layer 22, are provided, and then separators 62 and 64 are further disposed so as to sandwich the membrane-electrode assembly 50 and the gas diffusion layers 52 and 54. Here, the layer formed of carbon fibers 24 is formed of an aggregate of carbon fibers 24, and this aggregate of carbon fibers 24 is bonded to the water-repellent layer 22 to form the gas diffusion layers 52 and 54.

Normally, in a state of a cell of a fuel cell, even if the carbon fibers 24 protrude from the layer formed of carbon fibers 24 toward the water-repellent layer 22, the protrusion portion of the carbon fibers 24 stays within the water-repellent layer 22. However, when a plurality of cells of a fuel cell are stacked, a pressure is applied in the thickness direction of the gas diffusion layers 52 and 54 to thereby reduce the thickness of the gas diffusion layers 52 and 54. There is therefore a possibility that a protrusion portion 60 of the carbon fiber protrudes through the water-repellent layer 22 to damage the membrane-electrode assembly 50. Here, the damage to the membrane-electrode assembly 50 may result in poor fuel economy.

To address this problem, according to the manufacturing method and the manufacturing apparatus for a gas diffusion layer of a fuel cell of the present invention, when a plurality of cells of a fuel cell are stacked, even with the application of a contact pressure at the time of this stacking process, damage to a membrane-electrode assembly by carbon fibers of the gas diffusion layer can be prevented.

Figure 1:
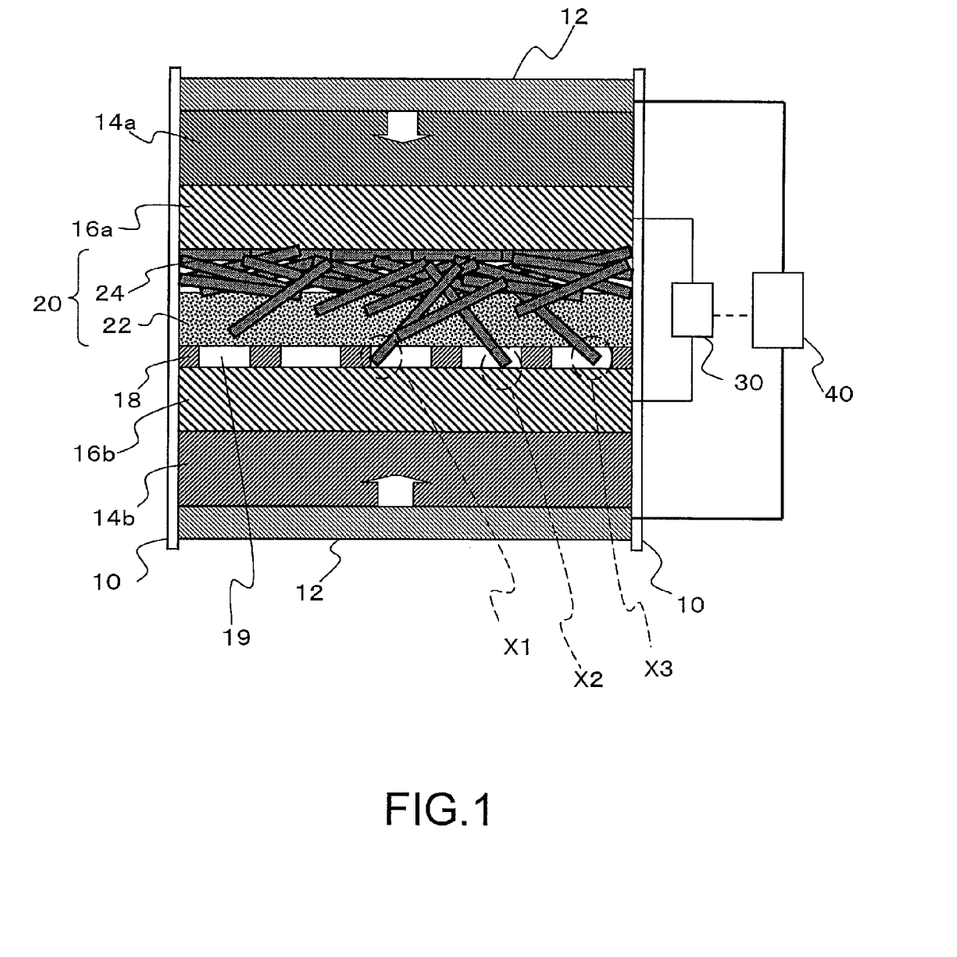
FIG. 1 is a view schematically illustrating an example structure of a manufacturing apparatus for a gas diffusion layer of a fuel cell according to an embodiment of the present invention.

FIG. 1 illustrates an example manufacturing apparatus for a gas diffusion layer of a fuel cell according to a present embodiment. As illustrated in FIG. 1, the manufacturing apparatus for a gas diffusion layer of a fuel cell according to the present embodiment includes a pressurizing unit which applies pressure to a gas diffusion layer 20 formed by stacking a layer formed of carbon fibers 24 and a water-repellent layer 22 in the thickness direction of the gas diffusion layer 20, and a removing unit that removes carbon fibers 24 protruding from the water-repellent layer 22 in a state in which a predetermined pressure is applied to the gas diffusion layer 20.

Here, the "predetermined pressure" as used in the present embodiment refers to "a pressure corresponding to a contact pressure which is applied at the time of stacking a plurality of cells of a fuel cell," and the "contact pressure" refers to a pressure applied in the thickness direction of the membrane-electrode assembly, the gas diffusion layer, or the like. Further, the "pressure corresponding to a contact pressure which is applied at the time of stacking a plurality of cells of a fuel cell" in the present embodiment is set appropriately in accordance with a stacking pressure of the cells of each fuel cell, and is about 0.1 MPa to 2 MPa, for example.

In the present embodiment, as the removing unit, one type of removing unit selected from a group consisting of a burning removing unit which uses Joule heat or oxygen plasma, a cutting removing unit which uses a cutting tool, and a bending removing unit for bending an edge portion of the carbon fiber protruding from the water-repellent layer. In this example, a burning removing unit which uses Joule heat will be described.

As illustrated in FIG. 1, the removing unit includes an insulating member 18 having a plurality of communication holes 19, which is disposed on a surface of the water-repellent layer 22 opposite a surface contacting the layer formed of carbon fibers 24, a pair of electrodes 16a and 16b provided so as to sandwich the gas diffusion layer 20 and the insulating layer 18, and a power source 30 which is a voltage application unit which applies a voltage to the pair of electrodes 16a and 16b.

As illustrated in FIG. 1, the pressurizing unit includes contact pressure plates 14a and 14b provided on the rear surfaces of the pair of electrodes 16a and 16b, respectively, so as to apply a pressure in the thickness direction of the gas diffusion layer 20; i.e. so as to apply a contact pressure to the gas diffusion layer 20, and a pressurizing device 12 which is capable of applying a contact pressure to the contact surface plates 14a and 14b in the direction of blank arrows illustrated in FIG. 1.

Further, as illustrated in FIG. 1, the manufacturing apparatus for a gas diffusion layer of a fuel cell according to the present embodiment is configured such that the pressurizing device 12, the contact pressure plates 14a and 14b, the electrodes 16a and 16b, the insulating member 18, and the gas diffusion layer 20 are sequentially disposed in a layered structure within a frame 10, and the power source 30 is electrically connected to the electrodes 16a and 16b, a controller 40 is electrically connected to the pressurizing device 12, and the power source 30 and the controller 40 are electrically connected to each other.

Also, in the layer formed of carbon fibers 24 in the present embodiment, as the aggregate of carbon fibers, a carbonaceous porous member such as carbon paper or carbon cloth is used, for example, and acrylic fibers and PAN (Polyacrylonitrile) carbon fibers obtained by carbonizing a pitch which is heated and rendered molten and then spun at high temperatures, for example, are used as the carbon fibers. Further, the water-repellent layer 22 is formed of fluorinated polymer such as polytetrafluoroethylene (PTFE), tetrafluoroethylene/hexafluoropropylene copolymer (FEP), and carbon black, and the water-repellent layer 22 is bonded to the aggregate of the carbon fibers 24 to form the gas diffusion layer 20.

Figure 2:
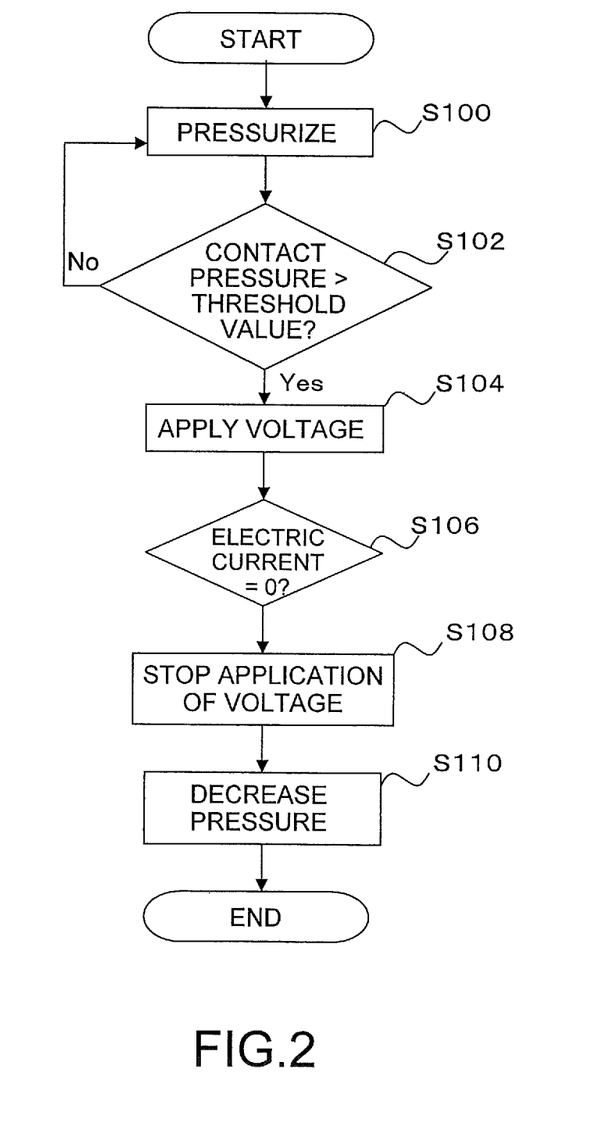
FIG. 2 is a flowchart illustrating an example manufacturing method for a gas diffusion layer of a fuel cell according to the embodiment of the present invention.

With reference to FIGS. 1 and 2, an example manufacturing method for the gas diffusion layer of a fuel cell according to the present embodiment will be described.

First, on the side of the gas diffusion layer 20 where the water-repellent layer 22 is provided, the insulating member 18 is disposed, and the gas diffusion layer 20 and the insulating member 18 are sandwiched by the pair of electrodes 16a and 16b. Further, the contact pressure plates 14a and 14b are disposed on the rear surfaces of the pair of electrodes 16a and 16b, respectively, for sandwiching the pair of electrodes 16a and 16b. Then, the pressurizing device 12, based on an output from the controller 40, pressurizes the contact pressure plates 14a and 14b in the directions of blank arrows illustrated in FIG. 1, respectively (S100). With the pressurization, the protrusion portions of the carbon fibers 24 which have been embedded in the water-repellent layer 22 protrude from the water-repellent layer 22, and the protrusion portions of the carbon fibers 24 thus protruding come in contact with the electrode 16b through the communication holes 19 of the insulating member 18 (corresponding to portions X1, X2, and X3 in FIG. 1 enclosed by dotted lines).

Then, upon the controller 40 detecting that the "contact pressure" applied by the pressurizing device 12 reaches "a threshold value" (S102), the controller 40 causes the power source 30 to apply a voltage to the pair of electrodes 16a and 16b while allowing the pressurizing device 12 to maintain this contact pressure state. Here, as the "threshold value," there is set "a pressure corresponding to a contact pressure which is applied at the time of stacking a plurality of cells of a fuel cell."

Next, upon application of a voltage to the pair of electrodes 16a and 16b (S104), because the carbon fibers have electric conductivity, the electric current flows in the protrusion portions of the carbon fibers contacting the electrode 16b through the communication holes 19 of the insulating member 18, so that the protruding carbon fibers are burned and removed by Joule heat. Then, when the controller 40 detects that the protrusion portion of the carbon fibers contacting the electrode 16b is burned to inhibit the electric current from flowing between the electrodes 16a and 16b (S106), the controller 40 causes the power source 30 to stop application of a voltage to the pair of electrodes 16a and 16b (S108). Further, the pressure in the pressurized state caused by the pressurizing device 12 is decreased to return the pressure to the normal pressure (S110), and the gas diffusion layer which has been processed as described above is extracted.

Here, the insulating member 18 has a thickness which is equal to or smaller than the thickness of the membrane-electrode assembly when stacked, so that damage to the membrane-electrode assembly caused by penetration through the membrane-electrode assembly or the like by the carbon fibers 24 protruding from the gas diffusion layer 20 can be prevented when the cells of the fuel cell are stacked.

While the diameter of the communication holes 19 provided in the insulating member 18 is selected as appropriate in accordance with the diameter and the length of the carbon fibers of the layer formed of the carbon fibers of the gas diffusion layer 20, the diameter of the communication holes 19 is preferably about several times as large as the diameter of the carbon fiber, so that protrusion of the carbon fibers protruding at the time of stacking can be removed more reliably.

While an example in which the insulating member 18 having the communication holes 19 as illustrated in FIG. 1 has been described, the present invention is not limited to this structure, and the insulating member 18 need not necessarily have the communication holes illustrated in FIG. 1, so long as the insulting member 18 is a member having an insulating property and is a member through which the carbon fibers penetrate easily, such as a porous or fibrous member. Further, as the protrusion of the carbon fibers is burned by Joule heat, the insulating member 18 is preferably a member which has an insulating property, through which the carbon fibers can easily penetrate, and which has heat resistance, and is preferably an insulating member formed of a silicone resin and asbestos and glass fiber, for example.

Further, as the voltage applied by the power source 30, a voltage which allows electric current with which the protrusion of the carbon fibers 24 contacting the electrode 16b can be burned to flow is sufficient, and the voltage is selected as appropriate in consideration of the heat resistant temperature of the insulating member 18.

Also, while in FIG. 1, the contact pressure plates 14a and 14b are moved in the directions indicated by the blank arrows, respectively, so as to apply the contact pressure from both sides of the gas diffusion layer 20, the present invention is not limited to this structure, and at least one of the surface pressure plates may be used to apply the contact pressure.

Figure 3:
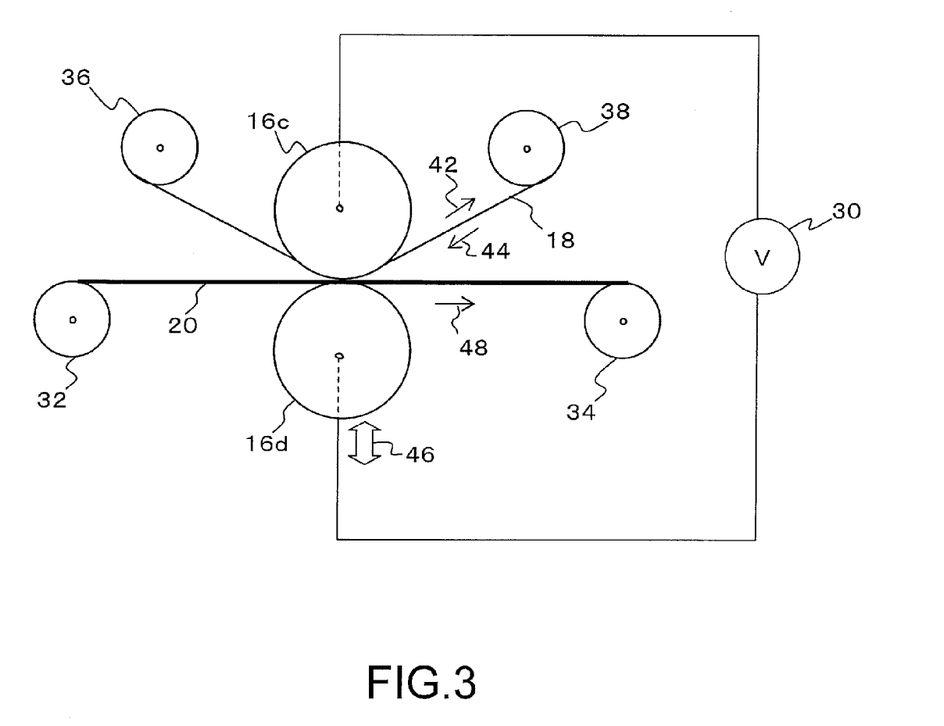
FIG. 3 is a view schematically illustrating a structure of another example manufacturing apparatus for a gas diffusion layer of a fuel cell according to an embodiment of the present invention.

FIG. 3 illustrates another example manufacturing apparatus for a gas diffusion layer of the present embodiment. In this example, structural elements which are the same as those of the manufacturing apparatus for a gas diffusion layer according to the above-described example are designated by the same reference numerals and explanation thereof will be omitted. As illustrated in FIG. 3, another manufacturing apparatus for a gas diffusion layer of a fuel cell in this embodiment includes roll-like electrodes 16c and 16d which are capable of applying a load. The roll-like electrodes 16c and 16d are electrically connected to a power source 30 which applies a voltage to the roll-like electrodes 16c and 16d. Also, a belt-like gas diffusion layer 20 is intermittently transported between the pair of roll-like electrodes 16c and 16d by means of rotating rollers 32 and 34. Further, an insulating layer 18 is intermittently transported between the pair of roll-like electrodes 16c and 16d so as to be superposed on the water-repellent layer side of the gas diffusion layer 20, by means of rotating rollers 36 and 38.

Figure 4:
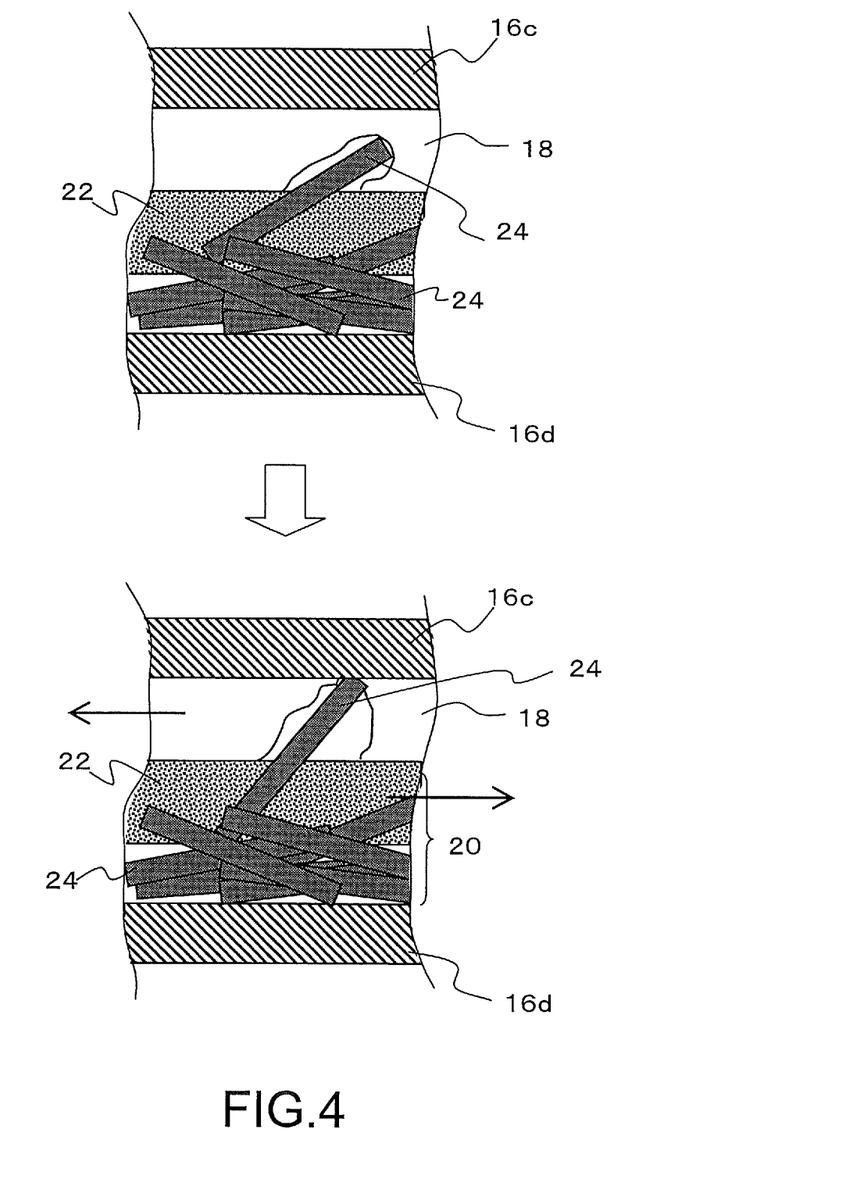
FIG. 4 is a view explaining a mechanism for causing a protrusion portion of carbon fibers protruding from a water-repellent layer to rise by sliding.

The operation of the manufacturing apparatus for a gas diffusion layer of a fuel cell according to the present embodiment will be described. By rotating the rollers 32 and 34 to transport the gas diffusion layer 20 in the direction of arrow 48 and rotating the rollers 36 and 38 to transport the insulating member 18 in the direction of arrow 42, the gas diffusion layer 20 and the insulating member 18 are transported between the pair of roll-like electrodes 16c and 16d such that the insulating member 18 is layered on the water-repellent layer side of the gas diffusion layer 20. Then, the transportation of the gas diffusion layer 20 and the insulating member 18 is stopped, and both or at least one of the roll-like electrodes 16c and 16d are moved in the direction for reducing the distance between the pair of roll-like electrodes 16c and 16d. In this state, the gas diffusion layer 20 and the insulating member 18 which are stacked are pressed by a predetermined pressure. Then, under this pressed state, the rollers 36 and 38 are reversely rotated to transport the insulating member 18 reversely in the direction of arrow 44. With this operation, as illustrated in FIG. 4, the gas diffusion layer 20 slides relative to the insulating member 18, so that a protrusion portion of carbon fibers 24 which protrudes slightly from the water-repellent layer 22 but does not penetrate through the insulating member 18, or the carbon fiber 24 which protrudes from the water-repellent layer 22 but is in a fallen state is caused to rise, and consequently, the protrusion portion of the carbon fibers 24 which has risen comes into contact with the roll-like electrode 16c. Then, a voltage is applied between the pair of roll-like electrodes 16c and 16d by the power source 30 and electricity flows in the carbon fibers 24 having electrical conductivity, so that the protruding carbon fibers 24 are burned and removed by Joule heat. Thereafter, one or both of the roll-like electrodes 16c and 16d are moved so as to increase the distance between the pair of roll-like electrodes 16c and 16d, and the gas diffusion layer 20 and the insulating member 18 are transported in the directions of arrows 48 and 42, respectively, by means of the rollers 32, 34 and 36, 38. Then, one or both of the roll-like electrodes 16c and 16d are moved in the direction for reducing the distance between the pair of roll-like electrodes 16c and 16d in a manner similar to that described above and a further surface of the gas diffusion layer 20 and the insulating member 18 are pressed together, thereby removing the carbon fibers 24 protruding from the water-repellent layer in a manner similar to that described above.

Here, control of the distance between the pair of roll-like electrodes 16c and 16d may be performed by moving only the electrode 16d as indicated by a blank arrow 46 illustrated in FIG. 3 (i.e., only from the side of the gas diffusion layer where the layer formed of carbon fibers is provided), for example. Further, the insulating member 18 may be a belt-like insulating member surrounding over the rollers 36 and 38, or an insulating member having end portions fixed to the rollers 36 and 38, respectively. If the end portions of the insulating member 18 are fixed to the rollers 36 and 38, respectively, the insulating member 18 moves in the direction of arrow 44 so as to raise the protrusion portion of the carbon fiber 24 and, after removal of the protruding carbon fibers, moves in the direction of arrow 42. In this case, the gas diffusion layer 20 may also be moved in the direction of arrow 48 simultaneously with the movement of the insulating layer 18 in the direction of arrow 44. As such, the gas diffusion layer sliding unit according to the present embodiment includes at least the rollers 36 and 38 for reversely transporting the insulting layer 18, and, in some cases, includes the rollers 32 and 34 for transporting the gas diffusion layer 20 in addition to the rollers 36 and 38.

Further, more preferably, the roll-like electrodes 16c and 16d are used to slide the gas diffusion layer 20 relative to the insulating member 18, simultaneously with pressing the gas diffusion layer 20 and the insulating member 18. It is also preferable that, simultaneously with pressing, a voltage is applied to the roll-like electrodes 16c and 16d by means of the power source 30.

As described above, by sliding the gas diffusion layer 20 relative to the insulating member 18, the carbon fiber which protrudes from the water-repellent layer but stays in a fallen state is caused to rise, so that the leading end of the carbon fiber comes into contact with the electrode. As a result, as compared with a case where sliding is not performed, the percentage removal of the carbon fibers protruding from the water-repellent layer can be increased. This leads to further reduction in the damage of the electrolyte membrane caused by the protrusion portion of the carbon fibers. Further, as excessive pressurization for making the protruding carbon fibers further protrude from the water-repellent layer is not required, the structure of the gas diffusion layer, particularly the structure of the layer formed of the carbon fibers, can be maintained.

In the above embodiment, the distance over which the gas diffusion layer 20 is relatively slid is preferably longer than the length of the carbon fibers, and the speed of sliding is several mm/second, for example. Further, more preferably, the gas diffusion layer 20 is slid relatively in two or more directions, in consideration of the protruding directions of the protruding fibers. In addition, by sliding at least one of the roll-like electrodes 16c and 16d in parallel along the plane direction of the gas diffusion layer 20 while pressing the gas diffusion layer 20, the carbon fibers protruding only slightly and the carbon fibers which protrude but stay in a fallen state can be caused to rise, so that the leading ends of the carbon fibers come into contact with the electrode and are burned and removed. Also, by setting the elastic modulus of the insulating member 18 lower than the elastic modulus of the carbon fiber 24, protrusion of the carbon fibers 24 through the insulating member 18 can be facilitated, so that the efficiency of burning and removing the protruding carbon fibers can be increased.

Figure 5:
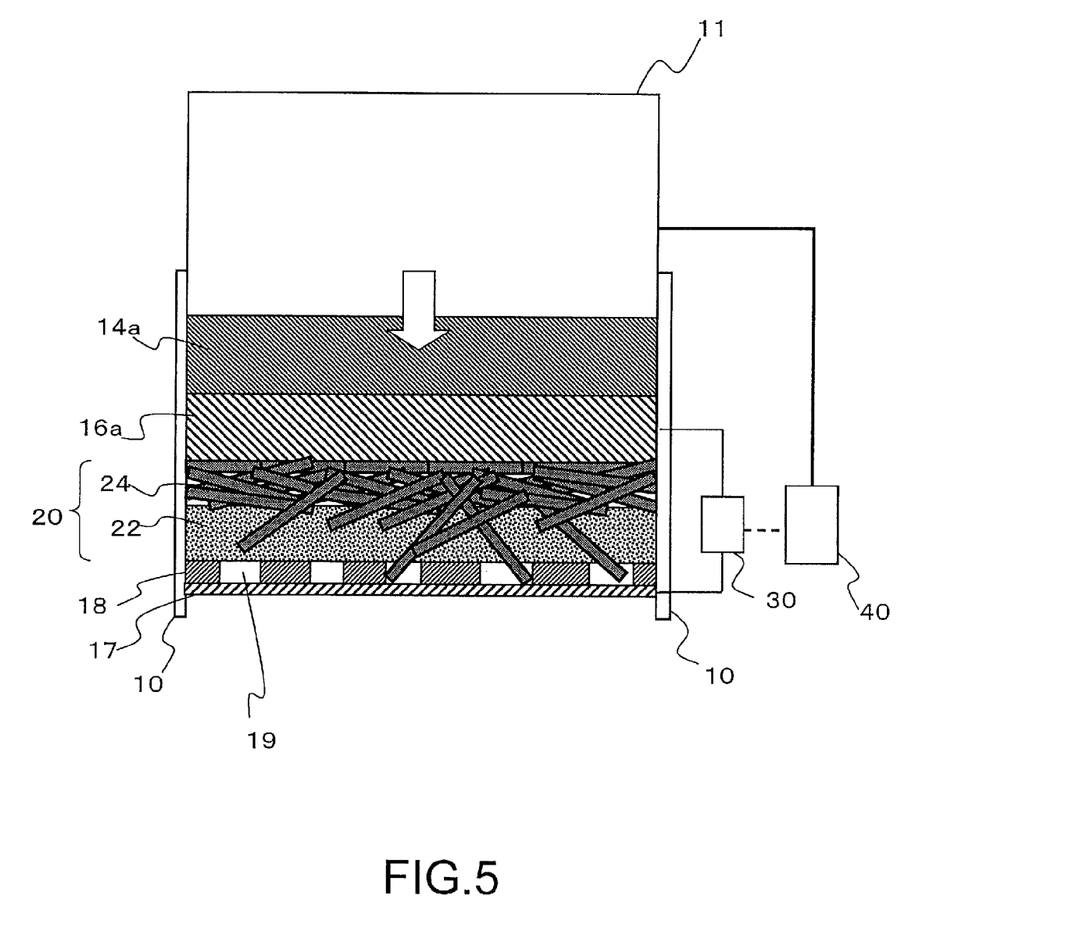
FIG. 5 is a view schematically illustrating a structure of another example manufacturing apparatus for a gas diffusion layer of a fuel cell according to an embodiment of the present invention.

FIG. 5 illustrates another example manufacturing apparatus for a gas diffusion layer of the present embodiment. In this example, structural elements which are the same as those of the manufacturing apparatus for a gas diffusion layer according to the above-described examples are designated by the same numerals and explanation thereof will be omitted. As illustrated in FIG. 5, another manufacturing apparatus for a gas diffusion layer of a fuel cell in this embodiment includes an insulating member 18 having a plurality of communication holes 19, which is disposed on the surface of a water-repellent layer 22 opposite the surface contacting a layer formed of carbon fibers 24, an electrode 16a in contact with a gas diffusion layer 20, a metal film 17 in contact with the insulating member 18, and a power source 30 which is a voltage application means that applies a voltage between the electrode 16a and the metal film 17.

A pressurizing means in the present embodiment is a pressurizing apparatus 11 which instantaneously applies a pressure which is equal to or greater than a predetermined pressure via a contact pressure plate 14a to the gas diffusion layer 20, only from the side of the gas diffusion layer 20 where the layer formed of carbon fibers 24 is provided, and a servo pulser is used as the pressurizing apparatus 11, for example. Here, "a predetermined pressure" refers to "a pressure corresponding to a contact pressure which is applied when a plurality of cells of a fuel cell are stacked." Further, "instantaneously applying a pressure which is equal to or greater than a predetermined pressure to the gas diffusion layer" refers to, immediately after application of the pressure which is equal to or greater than the predetermined pressure to the gas diffusion layer, releasing the applied pressure, and more specifically refers to applying an excessive contact pressure which is equal to or greater than a contact pressure applied when stacking a plurality of cells of a fuel cell and releasing this contact pressure immediately after application of the contact pressure. With this operation, in the case of the water-repellent layer 22 formed of a micro porous layer (which will be hereinafter also referred to an "MPL"), a load is applied to the MPL instantaneously and the protruding carbon fibers are burned and removed, so that the porous nature of the MPL can be maintained.

While the metal film 17 may be any film so long as it is conductive, it may be a metal leaf formed of gold (Au), copper (Cu), or the like, and may be bonded to a surface of the insulating member 18 which is opposite a surface contacting the MPL for example.

In order to apply a contact pressure instantaneously at a predetermined rate or greater to the gas diffusion layer 20, an "acceleration" which is obtained based on the following expression is added.

Gas diffusion layer mass(mass per unit area)× acceleration>contact pressure required(load per unit area)

Specifically,

Acceleration>contact pressure required(load per unit area)/gas diffusion layer mass(mass per unit area)     [Expression 1]

Figure 6:
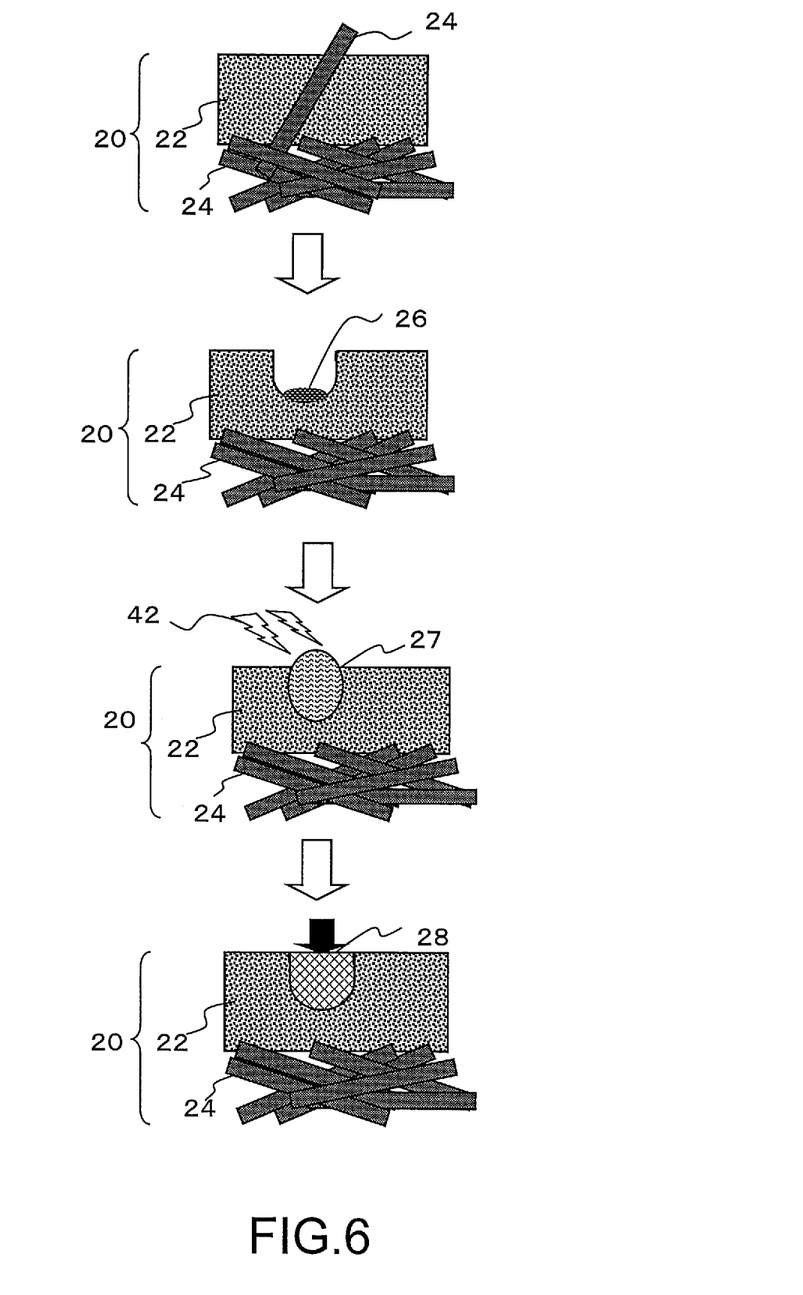
FIG. 6 is a view explaining an example method of filling a recess portion of a water-repellent layer formed after burning and removing the protruding carbon fiber.

FIG. 6 illustrates an example method for filling a recess portion of the water-repellent layer formed after burning and removing a protruding carbon fiber according to the apparatus and method in the above-described examples.

As illustrated in FIG. 6, after burning and removing the carbon fiber 24 protruding from the water-repellent layer 22, a recess portion is formed in the water-repellent layer 22 and soot-like carbon is stored in the recess portion after burning the carbon fiber 24. Here, in the recess portion formed in the water-repellent layer 22, electric conductivity is low, the draining property for water generated during the operation of a fuel cell is lower than that of other portions, and the gas diffusion property is also reduced. Also, there is a possibility that the generated water is accumulated in the recess portion. Accordingly, in the present embodiment, a material which is of the same kind as the material forming the water-repellent layer 22 is placed in the recess portion to form a filled portion 28. Specifically, a resin forming the water-repellent layer 22 (e.g. PTFE resin) is coated to the recess portion, and thereafter, ultrasonic waves are applied to mix the resin in the recess portion with the soot-like carbon 26 remaining in the recess portion, and the resulting mixture 27 is then baked, thereby filling the recess portion with the same kind of material as that forming the water-repellent layer 22. In this case, as the process of removing the soot-like carbon 26 remaining in the recess portion is not necessary, the recess portion can be filled with the composition which is substantially the same as that of the water-repellent layer 22 only by adding a resin. Further, as the conditions for application of the ultrasonic waves, mixture is performed for about 30 minutes at 20 kHz. If the filled portion 28 has a projecting shape after baking, as a pressure is partially applied to the membrane catalyst of the fuel cell, the surface of the water-repellent layer is leveled by repeatedly pressing the filled portion 28. The pressing conditions are set so as not to break the gas diffusion layer 20, and for example, leveling can be achieved by repeating the pressing with 1 Mpa per minute ten times at 100° C., for example.

With the method illustrated in FIG. 6, the electric conductivity, the gas diffusion property, and the draining property of the gas diffusion layer can be recovered.

Further, the manufacturing apparatus for a gas diffusion layer of a fuel cell according to the present embodiment includes, as a device structure for filling the recess portion, an application means that applies a material which is of the same kind as that forming the water-repellent layer in the recess portion formed in the water-repellent layer when burning and removing the carbon fibers protruding from the water-repellent layer, and a baking means that bakes the applied material, as required.

The fuel cell according to the present embodiment is formed by stacking a generator which is formed by stacking the gas diffusion layer manufactured by the manufacturing method for the gas diffusion layer described above to a membrane-electrode assembly including a fuel electrode on one surface of an electrolyte membrane and an air electrode on the other surface of the electrolyte membrane, and separators, in an alternating manner.

While the present invention has been described in detail, the scope of the present invention is not limited to the above examples.

Further, the description in the section of the detailed description of the invention in the specification, the claims, the drawings, and the abstract of Japanese Patent Application No. 2010-152668 filed on Jul. 5, 2010 and Japanese Patent Application No. 2010-264861 filed on Nov. 29, 2010 are incorporated in the present application in their entirety.

INDUSTRIAL APPLICABILITY

While the manufacturing method for a fuel cell and the fuel cell of the present invention are effective for any applications so long as a fuel cell is used, the present invention is particularly useful for a fuel cell for a vehicle.

The invention claimed is:

1. A manufacturing method for a gas diffusion layer of a fuel cell, comprising the steps of:
prior to layering a plurality of cells of a fuel cell in a stack, applying a predetermined first pressure to a gas diffusion layer, formed by stacking a layer made of a carbon fiber and a water-repellent layer, in a thickness direction of the gas diffusion layer; and
removing a carbon fiber protruding from the water-repellent layer when the gas diffusion layer is pressed with the predetermined first pressure,
wherein the step of removing a protruding carbon fiber is a step of burning and removing the protruding carbon fiber by passage of electricity through the protruding carbon fiber, and
wherein a value of the predetermined first pressure corresponds to a value of a second pressure which is to be applied to the gas diffusion layer in a step of layering the plurality of cells of a fuel cell layered in a stack.

2. The manufacturing method for a gas diffusion layer of a fuel cell according to claim 1,
wherein the step of removing a protruding carbon fiber is a step of disposing an insulating member on a surface of the water-repellent layer which is opposite a surface thereof contacting the layer made of a carbon fiber, further disposing a pair of electrodes so as to sandwich the gas diffusion layer and the insulating member, and burning and removing the protruding carbon fiber by passage of electricity through the carbon fiber which protrudes from the water-repellent layer and further passes through the insulating member to come in contact with one of the electrodes.

3. The manufacturing method for a gas diffusion layer of a fuel cell according to claim 2, further comprising, prior to the passage of electricity through the carbon fiber which is protruding,
a sliding step of sliding the gas diffusion layer in a direction of a plane of the gas diffusion layer relative to the insulating member, under a pressed state.

4. The manufacturing method for a gas diffusion layer of a fuel cell according to claim 1, wherein
the step of applying a predetermined pressure is a step of instantaneously applying a pressure which is equal to or greater than a predetermined pressure to the gas diffusion layer only from a side of the gas diffusion layer where the layer made of a carbon fiber is provided, and
the step of removing a protruding carbon fiber is a step of disposing an insulating member on a surface of the water-repellent layer which is opposite a surface thereof contacting the layer made of a carbon fiber, further disposing a pair of electrodes so as to sandwich the gas diffusion layer and the insulating member, and burning and removing the protruding carbon fiber by passage of electricity through the carbon fiber which protrudes from the water-repellent layer and further passes through the insulating member to come in contact with one of the electrodes.

5. The manufacturing method for a gas diffusion layer of a fuel cell according to claim 4, wherein
the predetermined pressure is a pressure corresponding to a contact pressure which is applied when a plurality of cells of a fuel cell are layered in a stack.

6. The manufacturing method for a gas diffusion layer of a fuel cell according to claim 1, wherein
a recess portion formed in the water-repellent layer when the carbon fiber protruding from the water-repellent layer is burned and removed is filled with a material which is of the same kind as a material forming the water-repellent layer.

7. The manufacturing method for a gas diffusion layer of a fuel cell according to claim 2, wherein
a recess portion formed in the water-repellent layer when the carbon fiber protruding from the water-repellent layer is burned and removed is filled with a material which is of the same kind as a material forming the water-repellent layer.

8. The manufacturing method for a gas diffusion layer of a fuel cell according to claim 3, wherein
a recess portion formed in the water-repellent layer when the carbon fiber protruding from the water-repellent layer is burned and removed is filled with a material which is of the same kind as a material forming the water-repellent layer.

9. The manufacturing method for a gas diffusion layer of a fuel cell according to claim 4, wherein
a recess portion formed in the water-repellent layer when the carbon fiber protruding from the water-repellent layer is burned and removed is filled with a material which is of the same kind as a material forming the water-repellent layer.

10. The manufacturing method for a gas diffusion layer of a fuel cell according to claim 1, wherein
a recess portion formed in the water-repellent layer when the carbon fiber protruding from the water-repellent layer is burned and removed is filled with a material which is of the same kind as a material forming the water-repellent layer.

11. The manufacturing method for a gas diffusion layer of a fuel cell according to claim 5, wherein
a recess portion formed in the water-repellent layer when the carbon fiber protruding from the water-repellent layer is burned and removed is filled with a material which is of the same kind as a material forming the water-repellent layer.

* * * * *